United States Patent
Fornage

(10) Patent No.: US 9,450,405 B2
(45) Date of Patent: Sep. 20, 2016

(54) METHOD AND APPARATUS FOR REACTIVE POWER CAPABLE INVERTERS

(71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 363 days.

(21) Appl. No.: 14/189,813

(22) Filed: Feb. 25, 2014

(65) Prior Publication Data

US 2014/0239726 A1 Aug. 28, 2014

Related U.S. Application Data

(60) Provisional application No. 61/768,894, filed on Feb. 25, 2013.

(51) Int. Cl.
| | |
|---|---|
| *H02J 3/00* | (2006.01) |
| *H02J 3/38* | (2006.01) |
| *H02J 5/00* | (2016.01) |
| *H02M 7/5387* | (2007.01) |

(52) U.S. Cl.
CPC .................. *H02J 3/00* (2013.01); *H02J 3/385* (2013.01); *H02M 7/53875* (2013.01); *Y02E 10/58* (2013.01); *Y10T 307/707* (2015.04)

(58) Field of Classification Search
CPC ........................................................ H02J 5/00
USPC ............................................................ 307/31
See application file for complete search history.

(56) References Cited

U.S. PATENT DOCUMENTS

| | | |
|---|---|---|
| 8,350,411 B2 | 1/2013 | Kimball et al. |
| 8,638,581 B2 | 1/2014 | Zacharias et al. |
| 2007/0159866 A1 | 7/2007 | Siri |
| 2009/0080226 A1 | 3/2009 | Fornage |
| 2010/0141041 A1 | 6/2010 | Bose et al. |
| 2011/0285205 A1 | 11/2011 | Ledenev et al. |
| 2011/0291480 A1 | 12/2011 | Nair et al. |
| 2011/0307199 A1 | 12/2011 | Klein et al. |

OTHER PUBLICATIONS

PCT International Search Report and Written Opinion, PCT/US2014/018389, Date of Mailing Jun. 9, 2014.
International Search Report and Written Opinion, PCT/US2014/018389, 10 Pages, Mailed on Jun. 9, 2014.

*Primary Examiner* — Robert Deberadinis
(74) *Attorney, Agent, or Firm* — Moser Taboada

(57) ABSTRACT

A system, method, and apparatus for converting DC input power to AC output power, including a DC-AC inverter employing: a first feedback loop for determining a maximum power point (MPP) and operating the DC-AC inverter proximate the MPP. A second feedback loop for determining a difference between a first power measurement and a second power measurement, producing an error signal indicative of the difference, and coupling the error signal to the first feedback loop to adjust at least one operating parameter of the DC-AC inverter to drive toward the MPP, where the first power measurement and the second power measurement are each determined based on a phase shift between an AC output voltage from the DC-AC inverter and an AC output current from the DC-AC inverter.

20 Claims, 10 Drawing Sheets

METHOD AND APPARATUS FOR REACTIVE POWER CAPABLE INVERTERS

CROSS-REFERENCE TO RELATED APPLICATION

This application claims priority to U.S. Provisional Patent Application No. 61/768,894 filed on Feb. 25, 2013, which is incorporated by reference herein in its entirety.

BACKGROUND OF THE INVENTION

1. Field of the Invention

Embodiments of the present disclosure generally relate to power conversion and, more particularly, to a method and apparatus for improved burst mode operation.

2. Description of the Related Art

Solar panels, or photovoltaic (PV) modules, convert energy from sunlight received into direct current (DC). The PV modules cannot store the electrical energy they produce, so the energy must either be distributed to an energy storage system, such as a battery or pumped hydroelectricity storage, or distributed by a load. One option to use the energy produced is to employ one or more inverters to convert the DC current into an alternating current (AC) and couple the AC current to the commercial power grid. The power produced by such a distributed generation (DG) system can then be sold to the commercial power company.

PV modules have a nonlinear relationship between the current (I) and voltage (V) that they produce. A maximum power point (MPP) on an I-V curve for a PV module identifies the optimal operating point of the PV module; when operating at this point, the PV module generates the maximum possible output power for a given temperature and solar irradiance. Therefore, in order to optimize power drawn from a PV module, a power conversion device coupled to the PV module, such as an inverter or a microinverter, generally employs a maximum power point tracking (MPPT) technique to ensure that the PV module is operated at the current and voltage levels corresponding to its MPP. The MPPT acts to rapidly adjust the PV module operating current and voltage levels in response to changes in solar irradiance and/or temperature such that the PV module can continue to operate at the MPP.

During the time period required for an MPPT technique to bias a PV module to its MPP, for example, when the solar irradiance on a PV module changes from no irradiance to increasing irradiance or at a PV module/inverter initial activation, a power conversion device coupled to the PV module will suffer from a lower efficiency until the MPP is achieved. Additionally, a power conversion device coupled to a PV module generally will suffer from a lower efficiency when the PV module is operating at a low power, e.g., low irradiance. During low irradiance, a PV module and an associated inverter may operate so inefficiently that is it best for overall system efficiency to deactivate the PV module and/or its inverter until solar irradiance increases.

In some instances, AC power from the power grid is subject to phase shift causing the voltage and current to be out of phase. The out-of-phase component of the AC power is commonly referred to as reactive power set by rule or request. The grid or PV plant operator may require that the inverters operate with a phase shift between the AC grid voltage and the AC current generated in order to help stabilize grid voltage, or to inject a desired amount of reactive power into the grid to maintain the mains voltage at a proper level in view of time inductance. Such a phase shift impacts the PV voltage and current and may degrade MPPT accuracy. The inverters knows what power factor/phase shift to operate with, where the phase shift Phi, such that tan(phi) =Q/P, where Q is the amount of reactive power generated (positive or negative) and P is the real generated power.

Therefore there is a need in the art for a method and apparatus to achieve MPP with AC power having a reactive component.

SUMMARY OF THE INVENTION

Embodiments of the present invention generally relate to a method and apparatus for converting DC input power to AC output power substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
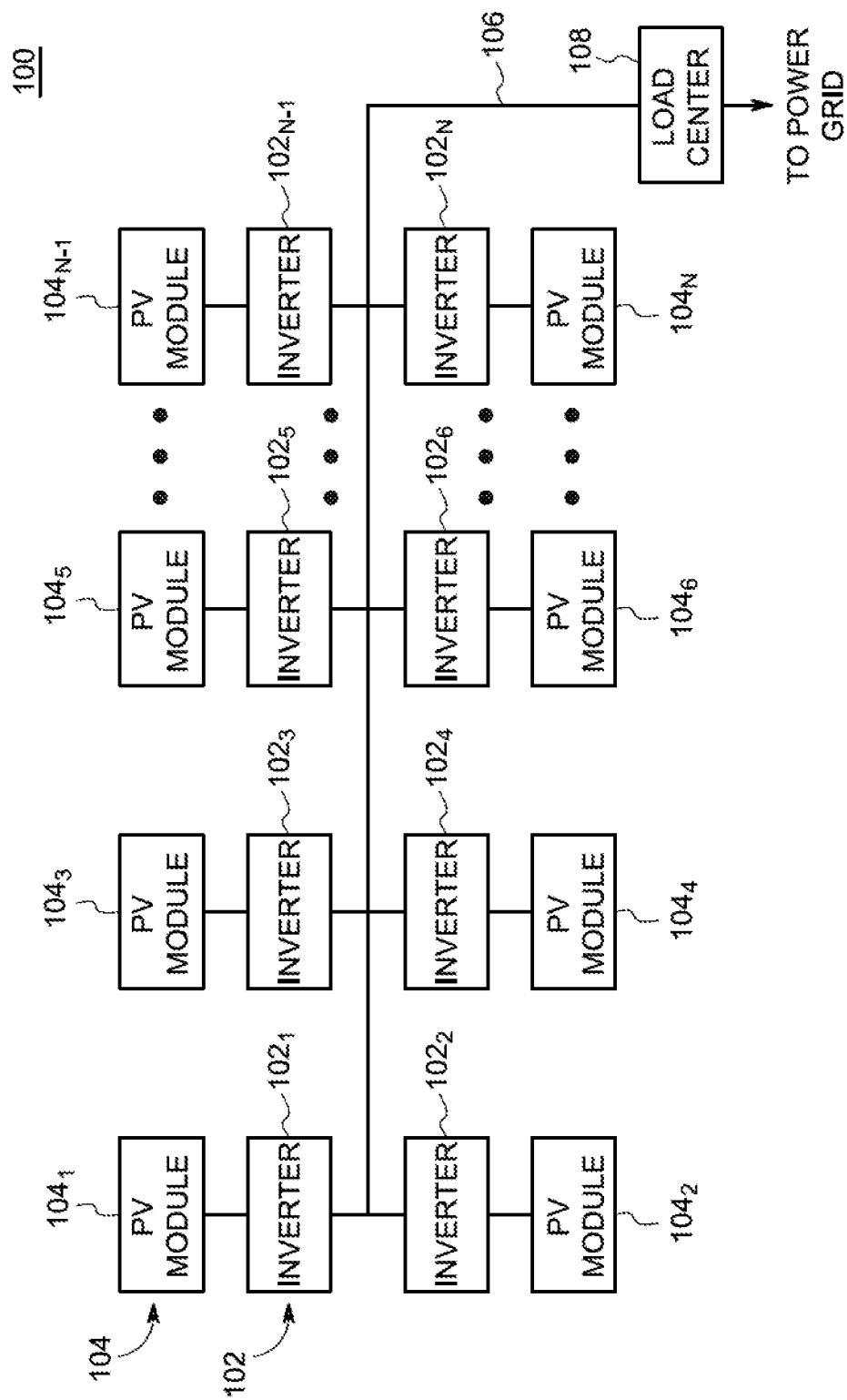
FIG. 1 is a block diagram of a system for distributed generation (DG) in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of inverters $102_1$, $102_2$ ... $102_n$, collectively referred to as inverters 102, a plurality of PV modules $104_1$, $104_2$ ... $104_n$, collectively referred to as PV modules or arrays 104, an AC bus 106, and a load center 108.

Each inverter $102_1$, $102_2$ ... $102_n$ is coupled to a PV module $104_1$, $104_2$ ... $104_n$, respectively. In some embodiments, a DC-DC converter may be coupled between each PV module 104 and each inverter 102 (e.g., one converter per PV module 104). Alternatively, multiple PV modules 104 may be coupled to a single inverter 102 (i.e., a centralized inverter); in some embodiments, a DC-DC converter may be coupled between the PV modules 104 and the centralized inverter. The inverters may be coupled to one another in parallel, in series, or a combination of series and parallel.

In accordance with one or more embodiments of the present invention, each inverter 102 employs an MPPT technique (described in detail below) to operate the subtending PV module 104 at its MPP such that the PV module 104 generates an optimal power output for a given temperature and solar irradiation. The inverters 102 are coupled to the AC bus 106, which in turn is coupled to the load center 108. The load center 108 houses connections between incoming power lines from a commercial power grid distribution system and the AC bus 106. The inverters 102 convert DC power generated by the PV modules 104 into AC power, and may meter out AC current that is in-phase with the AC commercial power grid voltage, or may generate reactive power, for example on-demand in order to generate Volt-Ampere reactive (VAr) compensation. The system 100 couples the generated AC power to the commercial power grid via the load center 108.

In some embodiments, the inverters 102 employ a "burst mode" during periods of low power generation. In burst mode, the inverters 102 store energy over one or more AC grid voltage cycles ("energy storage periods" of Noff grid cycles) and subsequently "burst" the stored energy to the commercial power grid ("burst periods"). In some embodiments, a burst period is a single grid cycle, and further embodiments may include burst periods of different sizes (e.g., two grid cycles, or repeated as desired). The length of the energy storage periods (i.e., Noff) is determined such that a ripple voltage overriding the PV module output voltage remains below a desired ripple voltage threshold. In addition to improving the efficiency of the inverters 102, the burst mode facilitates a rapid convergence to the MPP utilizing an MPPT technique described below. Upon operating proximate the MPP, and if the PV modules 104 are supplying sufficient output power, the inverters 102 deactivate the burst mode and operate in a continuous mode, utilizing the MPPT technique to remain proximate to the MPP. In the event that the solar irradiance and/or temperature changes to a level such that the output power from the PV modules 104 drops below a burst mode threshold, one or more of the inverters 102 switch back to burst mode.

If the PV plant must provide a given amount of Volt-ampere reactive (VAr) at low power, several options are available. In some instances, when reactive power is required and burst mode is employed, the VAr may be multiplied by Noff+1 in order to average to the correct time-averaged value. As the units are not synchronized, the aggregate waveform is acceptable. According to another embodiment, as many PV units as required with the maximum reactive power possible are run continuously to achieve the best efficiency, where regular burst mode is enabled without VAr on the other PV units. Both options may coexist, and the choice of selecting one option over another is based on which option provides the optimum efficiency. For more detail see U.S. patent application Ser. No. 13/615,920, filed Sep. 14, 2012 and titled "Method and Apparatus for Improved Burst Mode During Power Conversion", hereby incorporated by reference in its entirety.

Figure 2:
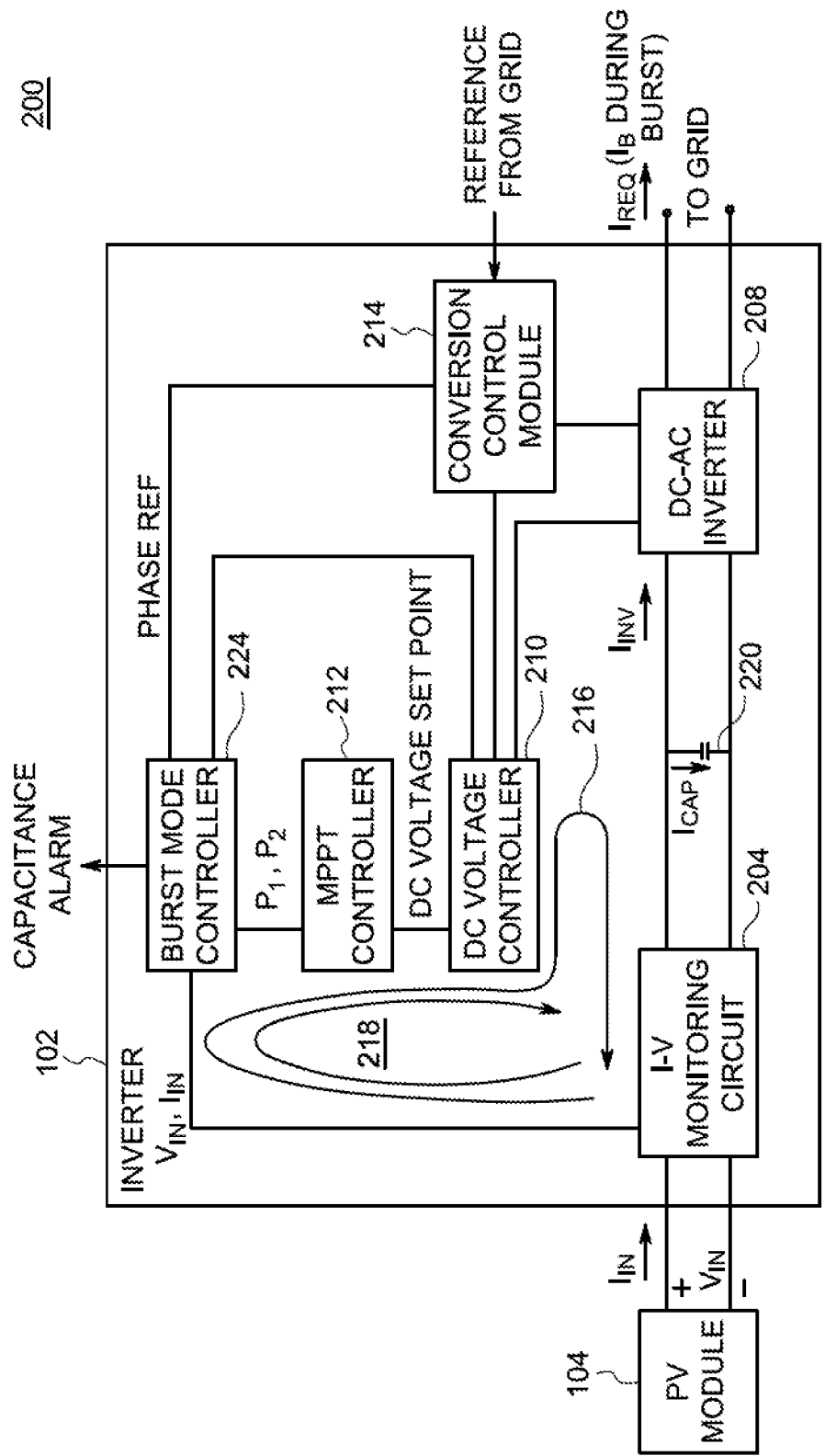
FIG. 2 is a block diagram of an inverter in accordance with one or more embodiments of the present invention.

FIG. 2 is a block diagram of an inverter 102 in accordance with one or more embodiments of the present invention. The inverter 102 comprises an I-V monitoring circuit 204, a storage capacitor 220, a DC-AC inverter 208, a DC voltage controller 210, an MPPT controller 212, a burst mode controller 224, and a conversion control module 214. The inverter 102 is coupled to the PV module 104 and to the commercial power grid.

The I-V monitoring circuit 204 is coupled to the PV module 104, the storage capacitor 220, and the burst mode controller 224. The burst mode controller 224 is further coupled to the DC voltage controller 210, the MPPT controller 212, and the conversion control module 214. Additionally, the MPPT controller 212 is coupled to the DC voltage controller 210, and the DC voltage controller 210 is coupled to the conversion control module 214. The DC voltage controller 210 functions to bias the PV module 104 at a DC voltage set point (i.e., a desired PV module operating voltage), while the MPPT controller 212 drives such DC voltage set point to correspond to the MPP voltage. The burst mode controller 224 functions to switch the inverter 102 between continuous mode and burst mode, and additionally measures input power from the PV module 104 that is utilized by the MPPT controller 212 in determining the DC voltage set point.

The I-V monitoring circuit 204 monitors the instantaneous input voltage and current, $V_{in}$ and $I_{in}$, respectively, from the PV module 104. The storage capacitor 220, in addition to being coupled to the I-V monitoring circuit 204, is coupled to the DC-AC inverter 208, and the DC-AC inverter 208 is further coupled to the DC voltage controller 210, the conversion control module 214, and the commercial power grid. A current $I_{cap}$ flows through the storage capacitor 220, and a current $I_{inv}$ flows to the DC-AC inverter 208.

The conversion control module 214 receives a reference signal from the commercial power grid, and provides the control signals for the DC-AC inverter 208 to convert the received DC current, $I_{inv}$, to a required AC output current, $I_{req}$. One example of such power conversion is commonly assigned U.S. Patent Application Publication Number 2007/0221267 entitled "Method and Apparatus for Converting Direct Current to Alternating Current" and filed Sep. 27, 2007, which is herein incorporated in its entirety by reference. The AC output current $I_{req}$ from the DC-AC inverter 208 may be coupled to the commercial power grid such that it is in-phase with the commercial AC current, or the AC output current from the DC-AC inverter 208 may be coupled to the commercial power grid with a phase shift between the AC current and the AC voltage.

The DC voltage controller 210 employs a first feedback loop (an "inner" loop) 216 to bias the PV module 104 at the DC voltage set point by modulating the current $I_{in}$ drawn from the PV module 104. The first feedback loop 216 comprises the I-V monitoring circuit 204, the burst mode controller 224, the MPPT controller 212, the DC voltage controller 210, and the DC-AC inverter 208. The DC voltage controller 210 receives a signal indicative of the PV module DC (i.e., average) input voltage $V_{DC}$ from the burst mode controller 224, and receives the DC voltage set point from the MPPT controller 212. Based on a difference between the $V_{DC}$ and the DC voltage set point, the first feedback loop 216 drives the DC-AC inverter 208 to generate $I_{req}$ such that the appropriate current $I_{in}$ is drawn from the PV module 104 to bias the PV module 104 at the DC voltage set point. Thus, the first feedback loop 216 iteratively computes a difference between the average PV module operating voltage and a DC voltage set point for the PV module 104, and accordingly adjusts the current $I_{in}$ drawn from the PV module 104 such that the PV module 104 is biased at the DC voltage set point (i.e., at an operating current and voltage that approximately corresponds to the MPP).

The MPPT controller 212 employs a second feedback loop 218 (an "outer" loop) to adjust the DC voltage set point such that it corresponds to the MPP voltage. The second feedback loop 218 comprises the I-V monitoring circuit 204, the burst mode controller 224, the MPPT controller 212, and the DC voltage controller 210. The burst mode controller 224 receives signals indicative of the instantaneous PV module input current and voltage, $I_{in}$ and $V_{in}$, respectively, through the I-V monitoring circuit 204, and computes the instantaneous input power, $P_{in}$, from the PV module 104. The burst mode controller 224 further processes the input power $P_{in}$, as described in greater detail below, to obtain a first and a second power measurement and provides such power measurements to the MPPT controller 212. The MPPT controller 212 determines a power difference between the first and second power measurements; based on the difference, the MPPT controller 212 determines whether the PV module operating voltage must be increased or decreased to reach the MPP, modifies the DC voltage set point accordingly, and supplies the new DC voltage set point to the DC voltage controller 210. Additionally, a power difference of zero indicates that the PV module 104 is currently biased at the MPP, and the MPPT controller 212 supplies the corresponding DC voltage set point to the DC voltage controller 210. The second feedback loop 218 thus iteratively determines whether the PV module 104 is operating proximate the MPP and, in the case where the PV module 104 is not operating proximate the MPP, modifies at least one operating parameter within the first feedback loop 216 to achieve the MPP (i.e., the outer loop "fine tunes" the setting established by the inner loop).

Upon initial operation or sufficiently low output power from the PV module 104, the burst mode controller 224 operates the inverter 102 in burst mode, wherein during energy storage periods (e.g., one or more AC grid voltage cycles of 16.67 msec), the storage capacitor 220 stores energy that is subsequently supplied to the DC-AC inverter 208 during a burst period. During burst mode, the burst mode controller 224 drives the DC voltage controller 210 such that the output current generated by the inverter 102, $I_{req}$, is a "burst mode current", $I_B$. Once the PV module 104 is operating proximate the MPP voltage, and if the PV module 104 is generating sufficient output power (i.e., if the PV module output power is greater than a pre-determined burst mode threshold), the burst mode controller 224 operates the inverter 102 in continuous mode. If the PV module output power subsequently drops below the burst mode threshold, the burst mode controller 224 switches the inverter 102 back to burst mode operation.

During energy storage periods of burst mode operation, the DC-AC inverter 208 is driven such that no output current is generated by the inverter 102 (i.e., $I_B$ is zero). During such periods, current is precluded from flowing to the DC-AC inverter 208, thereby causing current generated by the PV module 104 to charge the storage capacitor 220. The inverter 102 remains in an energy storage period for a number of AC grid voltage cycles, $N_{off}$, as determined by the burst mode controller 224, before beginning a burst period of one AC grid voltage cycle. During the burst period, the burst mode controller 224 causes the DC voltage controller 210 to drive the DC-AC inverter 208 such that the burst current $I_B$ is generated in accordance with the energy that has been stored in the storage capacitor 220 during the previous energy storage period. As a result, the inverter output current during a burst period, $I_B$, is greater than the inverter output current during continuous mode, $I_{req}$, for a given level of solar irradiance and temperature. In some embodiments, $I_B = I_{req}*(N_{off}+1)$.

Due to the charging and discharging of the storage capacitor 220 during burst mode, a ripple voltage ("burst mode ripple voltage", or $V_r$) overrides the average voltage across the storage capacitor 220, and results in a corresponding burst mode ripple voltage overriding the PV module DC voltage, $V_{DC}$. As such, the PV module operating voltage fluctuates in accordance with the magnitude of the burst mode ripple voltage $V_r$; the greater the burst mode ripple voltage $V_r$, the greater the PV module operating voltage excursion. Such a fluctuation in the PV module operating voltage results in reduced efficiency of the inverter 102. For example, when operating proximate the MPP voltage, a larger voltage fluctuation around the MPP voltage results in a greater period of time that the PV module 104 is operating off of the MPP voltage, resulting in less than optimal power being drawn from the PV module 104.

The magnitude of the burst mode ripple voltage $V_r$ varies in accordance with the length of time the storage capacitor 220 charges and discharges; i.e., with the energy storage and burst periods. The burst mode controller 224 controls the energy storage period, i.e., the number of AC grid voltage cycles of the energy storage period, $N_{off}$, such that the burst mode ripple voltage $V_r$ remains below a pre-determined threshold, thereby improving the efficiency of the inverter 102 during burst mode operation.

During both the continuous and burst modes of operation, the ripple voltage caused by the charging and discharging of the storage capacitor 220 provides an opportunity for maximum power point tracking (MPPT). As the ripple voltage across the PV module 104 varies above and below an average (i.e., DC) PV module voltage, the PV module output power varies in accordance with the ripple voltage. If the PV module 104 produces more power when operating above its DC voltage than when operating below its DC voltage, then the PV module DC voltage is below the maximum power point (MPP) and must be increased to reach the MPP. If the PV module 104 produces more power when operating below its DC voltage than when operating above its DC voltage, then the PV module DC voltage is above the MPP and must be decreased to reach the MPP. Thus, the difference between the average power produced by the PV module 104 when it is operating above its DC voltage and when it is operating below its DC voltage indicates in which direction the PV module DC voltage must be shifted to achieve the MPP. Additionally, if the difference is zero, the PV module 104 is biased at the MPP. In some embodiments, such a power difference may be determined based on the PV module output power during certain phases of the AC grid voltage, as further described below.

Figure 3:
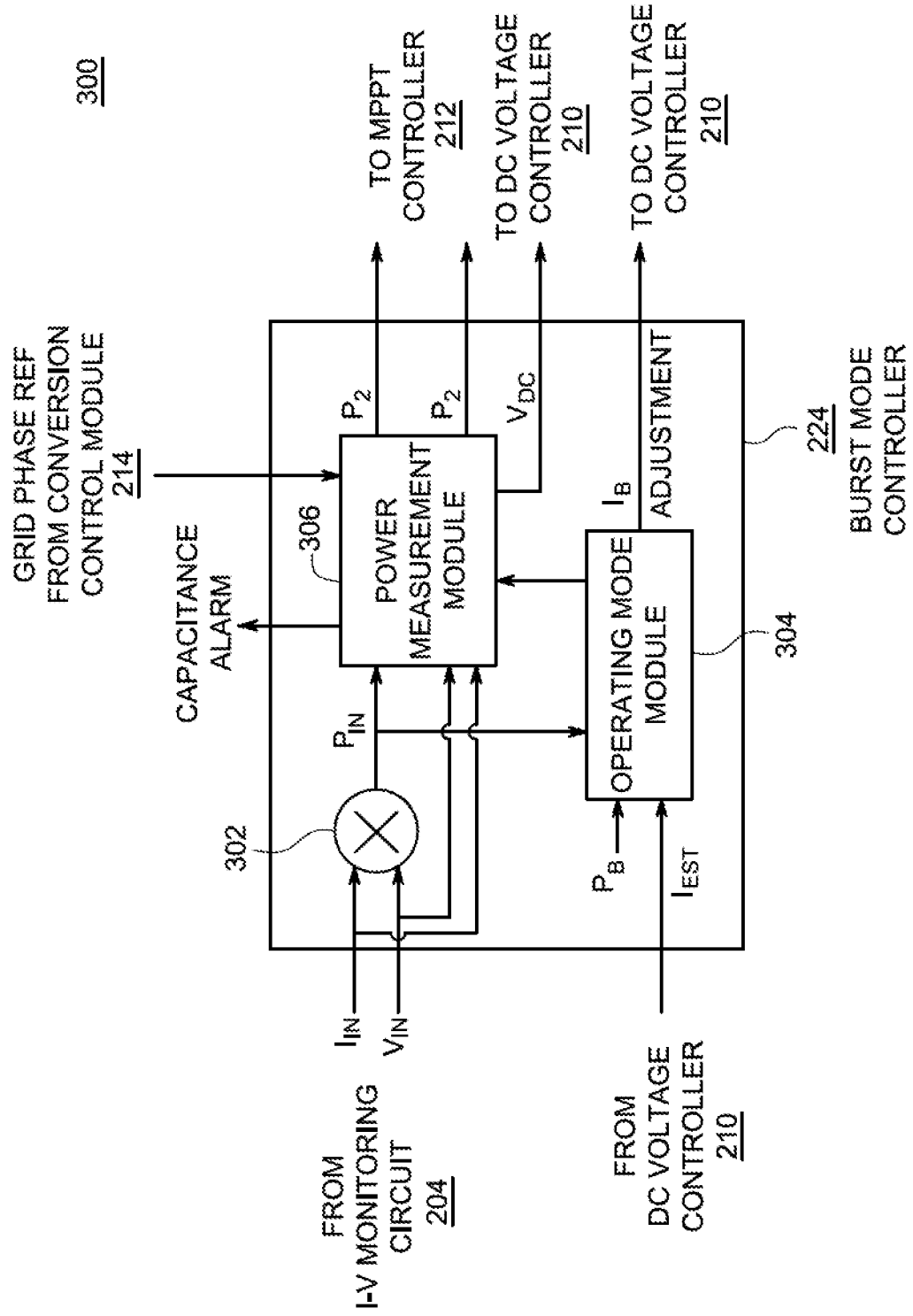
FIG. 3 is a block diagram of a burst mode controller in accordance with one or more embodiments of the present invention.

FIG. 3 is a block diagram of a burst mode controller 224 in accordance with one or more embodiments of the present invention. The burst mode controller 224 comprises a multiplier 302, an operating mode module 304, and a power measurement module 306.

In some instances, AC power from the power grid is subject to phase shift, causing the voltage and current of the AC power to be out of phase, commonly referred to as reactive power. This reactive power makes it difficult to perform MPPT and to obtain the MPP.

The multiplier 302 receives signals indicative of the instantaneous input current and voltage from the PV module 104, $I_{in}$ and $V_{in}$, respectively, through the I-V monitoring circuit 204, and generates an output signal indicative of the instantaneous input power from PV module 104, $P_{in}$. The output of the multiplier 302 is coupled to the power measurement module 306 and to the operating mode module 304; additionally, the power measurement module 306 receives inputs of $I_{in}$ and $V_{in}$. The operating mode module 304 is further coupled to the DC voltage controller 210, and receives a signal indicative of an estimated PV module input current, $I_{est}$, from the DC voltage controller 210. The $I_{est}$ is an estimated input current to be drawn from the PV module 104 to result in biasing the PV module 104 at a desired DC voltage set point. The operating mode module 304 is also coupled to the power measurement module 306, and additionally receives an input signal of a burst mode power threshold, $P_B$.

The operating mode module 304 compares the PV module input power $P_{in}$ to the burst mode threshold $P_B$. If the inverter 102 is operating in continuous mode and $P_{in}$ is less that $P_B$, the operating mode module 304 switches the inverter 102 to burst mode; once $P_{in}$ is greater than $P_B$, the operating mode module 304 switches the inverter 102 back to continuous mode.

In continuous mode, the power measurement module 306 receives an input indicative of the AC grid voltage phase from the conversion control module 214, for example, from a phase lock loop of the conversion control module 214. The power measurement module 306 integrates the PV module input power $P_{in}$ during certain portions of the AC grid voltage cycle to obtain a first power "bin", $PB_1$, and a second power "bin", $PB_2$ which are used in determining whether the PV module 104 is operating above or below its MPP as described in detail below. Additionally, the PV module input voltage $V_{in}$ is integrated over a portion of the AC grid voltage cycle to obtain a DC voltage bin, $V_{DC}B$, where $V_{DC}B$ is utilized to determine a DC (i.e., average) PV module input voltage, $V_{DC}$ for use in determining the required AC output current $I_{req}$ as described below. In some embodiments, during each cycle of the AC grid voltage when operating in continuous mode where reactive power is not present, the power measurement module 306 integrates $P_{in}$ during a 90°-180° phase of the AC grid voltage cycle (i.e., when the PV module 104 is operating below its average voltage value) to obtain $PB_1$, and integrates $P_{in}$ during a 180°-270° phase of the same AC grid voltage cycle (i.e., when the PV module 104 is operating above its average voltage value) to obtain $PB_2$. The PV module input voltage $V_{in}$ is integrated over the entire 90°-270° phase to obtain $V_{DC}B$. During burst mode, the power bins and the average PV module input voltage are determined as described further below.

However, when reactive power is present, the phases for integrating Pin and Vin are shifted from 90°/180°/270° by $\Theta/2$, where $\Theta$ is the phase shift of the AC current with respect to the AC voltage. For example, if $\Theta=30°$, PB1 and PB2 may be obtained by integrating Pin over the AC grid voltage cycle from 105°-195° and 195°-285°, respectively, and Vin is integrated over 105°-285° to obtain $V_{DC}B$. Alternatively, when $\Theta=30°$, PB1 and PB2 may be obtained by integrating Pin over the AC grid voltage from 285°-15° and 15°-105°, respectively, and Vin is integrated over 285°-15° to obtain $V_{DC}B$. In still other embodiments, when generating either real or reactive power, samples of the PV module operating voltage are averaged together to compute a threshold voltage (i.e., an average PV module operating voltage). Then, the energy produced for the PV voltage that is above the threshold is identified as a first bin and the energy produced for the PV voltage that is below the threshold is identified as a second bin. The first and second bins may then be compared to determine whether the PV module is biased at, above, or below its MPP and the DC voltage set point may be adjusted accordingly.

The power measurement module 306 determines a first and a second power measurement, $P_1$ and $P_2$, respectively, based on $PB_1$ and $PB_2$. During continuous mode, $P_1=PB_1$, and $P_2=PB_2$; during burst mode, the power measurements are determined as described further below. The first and second power measurements are supplied to the MPPT controller 212 for determining whether the PV module 104 is operating at, above, or below the MPP, and any required shift in the DC voltage set point to achieve the MPP. Additionally, the power measurement module 306 determines a PV module DC voltage, $V_{DC}$, based on $V_{DC}B$. The power measurement module 306 supplies $V_{DC}$ to the DC voltage controller 210 for determining $I_{req}$. The new DC voltage set point and the required output current $I_{req}$ are applied during the next AC grid voltage cycle.

When switching from continuous to burst mode, the operating mode module 304 may determine a maximum number of AC grid voltage cycles, $N_{off}$ for an energy storage period such that the burst mode ripple voltage $V_r$ will remain below a pre-determined threshold. For example, during burst mode, the power measurement module 306 integrates the PV module input power $P_{in}$ over certain portions of the AC grid voltage cycle during an energy storage period to obtain $PB_1$ and $PB_2$. To determine the portions of the AC grid voltage cycle over which to integrate $P_{in}$, the $N_{off}$ AC grid cycles of the energy storage period are partitioned into two equal portions—a "first half" of the energy storage period and a "second half" of the energy storage period, where the first half occurs prior to the second half.

The measured power bins $PB_1$ and $PB_2$ are then used by the power measurement module 306 to determine the first and second power measurements, $P_1$ and $P_2$, respectively. In some embodiments, $P_1=PB_1/N_{off}$ and $P_2=PB_2/N_{off}$ during burst mode. Additionally, the power measurement module 306 determines $V_{DC}$ based on $V_{DC}B$. The first and second power measurements $P_1$ and $P_2$ are supplied to the MPPT controller 212 and $V_{DC}$ is supplied to the DC voltage controller 210 for the appropriate MPPT and inverter output current processing. The output of such processing, i.e., the new DC voltage set point and the required output current from the inverter 102, are applied to the burst period following the next energy storage period.

According to one embodiment in which the AC voltage is in phase with the AC current, due to the power ripple at twice the grid frequency, the voltage across the PV module is higher than average when the AC grid voltage is between 0°-90° degrees and from 180°-270° degree phase. Additionally, the voltage across the PV module is below average when the AC grid voltage is between 90°-180° and 270°-360°. The calculated energy from time slots when the PV module voltage is above its average and when the PV module is below its average are compared and the PV voltage may be altered to make the energy of both slots identical, thereby operating at MPPT.

However, if the AC current is delayed by a phase shift theta, Θ the phase ranges for determining $PB_1$ and $PB_2$ are shifted by Θ/2. For instance, if Θ=30 deg, the analysis bins may be 105°-195° and 195°-285°, or 285°-15° and 15°-105°. If Θ=−30, the slots could be 75°-165° and 165°-255°, or 255°-345° and 345°-75°. Integrating $P_{in}$ during a 90°-180° phase of the AC grid voltage cycle to obtain a first power bin $PB_1$, and integrating during the 180°-270° phase of the same AC grid voltage cycle to obtain $PB_2$ will not aid in achieving MPPT when the current and voltage are out of phase.

According to an alternate embodiment for obtaining MPP when reactive power is present, the average operating voltage on the PV is derived and the energy produced for PV voltage above the average and PV voltage below the average are automatically binned in different bins (i.e., ranges or slots). The bins may then be compared to determine whether the PV module is biased at, above, or below its MPP, and the DC voltage set point may then be adjusted to drive the PV module toward the MPP.

Figure 4:
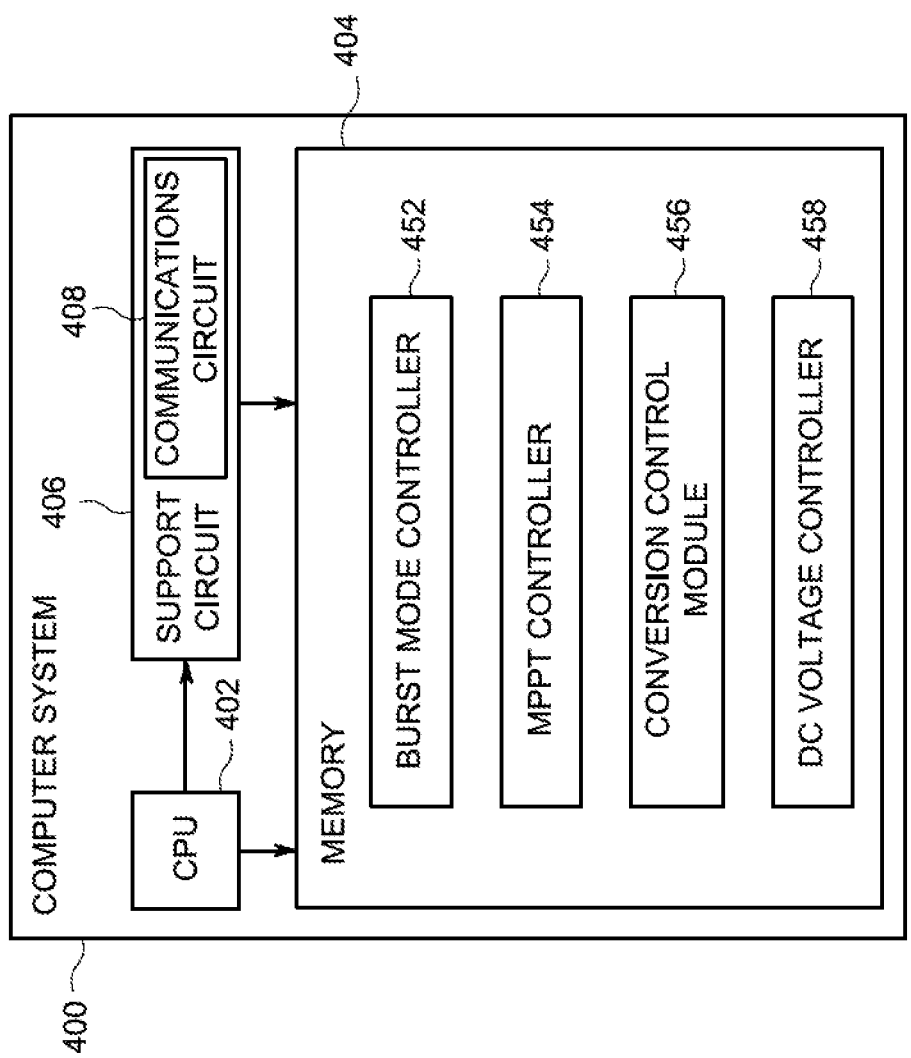
FIG. 4 is a plurality of waveforms depicting collection periods of PV module power and voltage measurements during burst mode in accordance with one or more embodiments of the present invention.

FIG. 4 is a block diagram of a computer system 400 as one embodiment of an exemplary implementation of a controller within an inverter. The computer system 400 includes a processor 402, a memory 404 and various support circuits 406. The central processing unit (CPU) 402 may include one or more microprocessors known in the art, and/or dedicated function processors such as field programmable gate arrays programmed to perform dedicated processing functions. The support circuits 408 for the processor 402 include microcontrollers, application specific integrated circuits (ASIC), cache, power supplies, clock circuits, data registers, input/output (I/O) interface, and the like.

The memory 404 stores non-transient processor-executable instructions and/or data that may be executed by and/or used by the processor 402. These processor-executable instructions may comprise firmware, software, and the like, or some combination thereof. Modules having processor-executable instructions that are stored in the memory 404 comprise a burst mode controller 452, an MPPT controller 454, a conversion control module 456 and a DC voltage controller 458. The modules in memory 404 perform the functions of the burst mode controller 224, the MPPT controller 214, the conversion control module 216 and the DC voltage controller 210, respectively, as described above with respect to FIG. 2.

In an exemplary embodiment, the memory 404 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like. The computer system 400 may be implemented using a general purpose computer that, when executing particular software, becomes a specific-purpose computer for performing various embodiments of the present invention.

Figure 5:
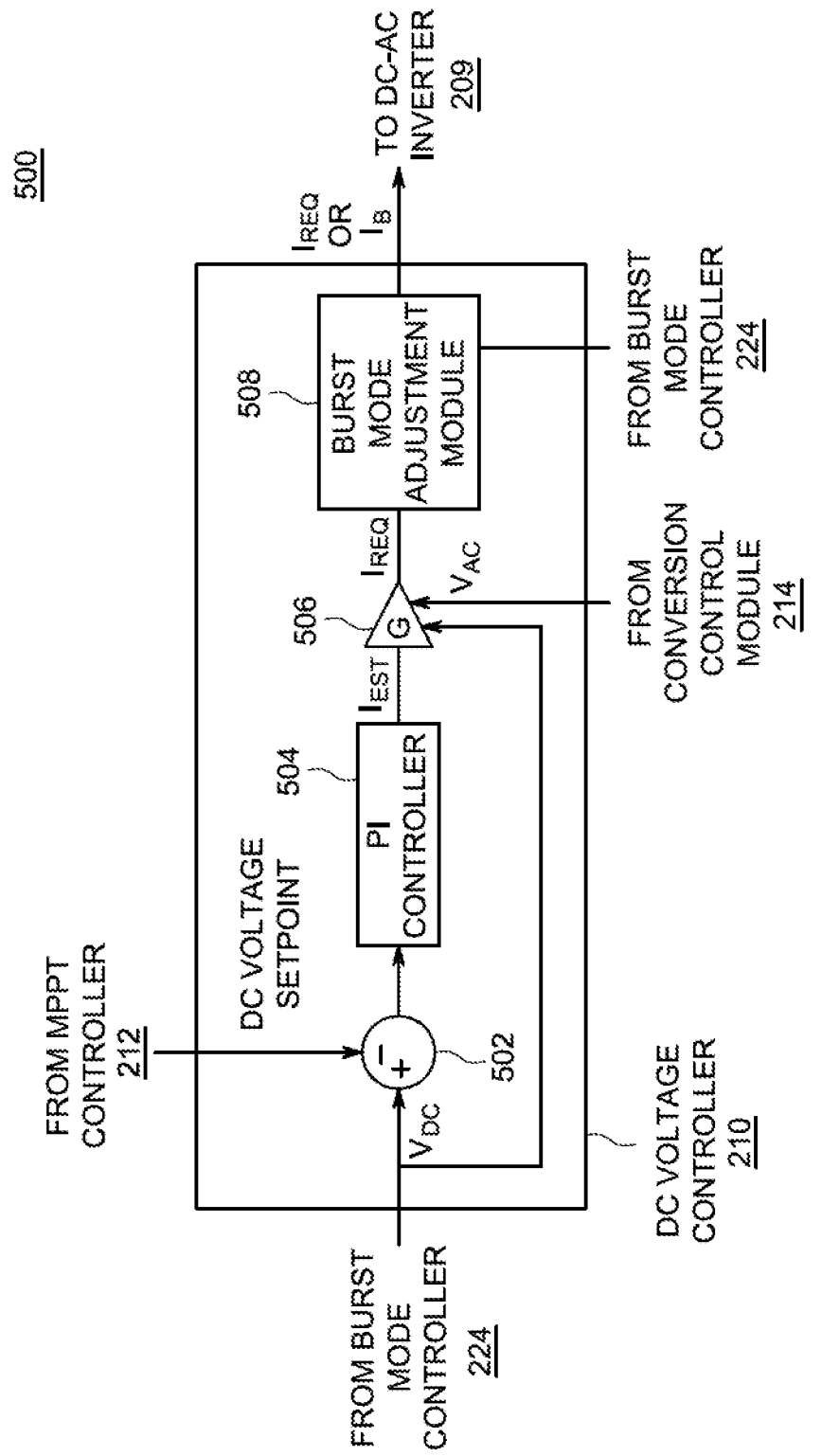
FIG. 5 is a block diagram of a DC voltage controller in accordance with one or more embodiments of the present invention.

FIG. 5 is a block diagram 500 of a DC voltage controller 210 in accordance with one or more embodiments of the present invention. The DC voltage controller 210 comprises an adder/subtractor 502, a proportional-integral (PI) controller 504, a gain module 506, and a burst mode adjustment module 508. The DC voltage controller 210 utilizes the first feedback loop 216 to control the current supplied to the DC-AC inverter 208 such that the PV module 104 is biased at the DC voltage set point.

The adder/subtractor 502 receives a signal indicative of the PV module DC voltage, $V_{DC}$, from the burst mode controller 224, and a signal indicative of the DC voltage set point from the MPPT controller 212. The output of the adder/subtractor 502 couples a difference between $V_{DC}$ and the DC voltage set point to the PI controller 504. The PI controller 504 acts to correct the difference by estimating an input current, $I_{est}$, to be drawn from the PV module 104 that will result in biasing the PV module 104 at the DC voltage set point.

The output of the PI controller 504 is coupled to the gain module 506 and provides a signal indicative of $I_{est}$ to the gain module 506. The gain module 506 further receives an input of the AC grid voltage amplitude, $V_{AC}$, from the conversion control module 214, and $V_{DC}$ from the burst mode controller 224, and determines the required output current from the inverter, $I_{req}$, to draw $I_{est}$ from the PV module 104. In some embodiments, $I_{req}$ is calculated as follows:

$$I_{req} = V_{DC} * I_{est} / V_{AC} * \text{eff}$$

In the above equation, eff is an efficiency rating of the inverter.

The output of the gain module 506 is coupled to the burst mode adjustment module 508. The burst mode adjustment module 508 adjusts the required inverter output current $I_{req}$ during burst mode such that it corresponds to the burst mode output current, $I_B$, in accordance with a control signal received from the burst mode controller 224. The output of the burst mode adjustment module 508 is coupled to the DC-AC inverter 208 and drives the DC-AC to generate an output current $I_{req}$ during continuous mode and an output current $I_B$ during burst mode.

Figure 6:
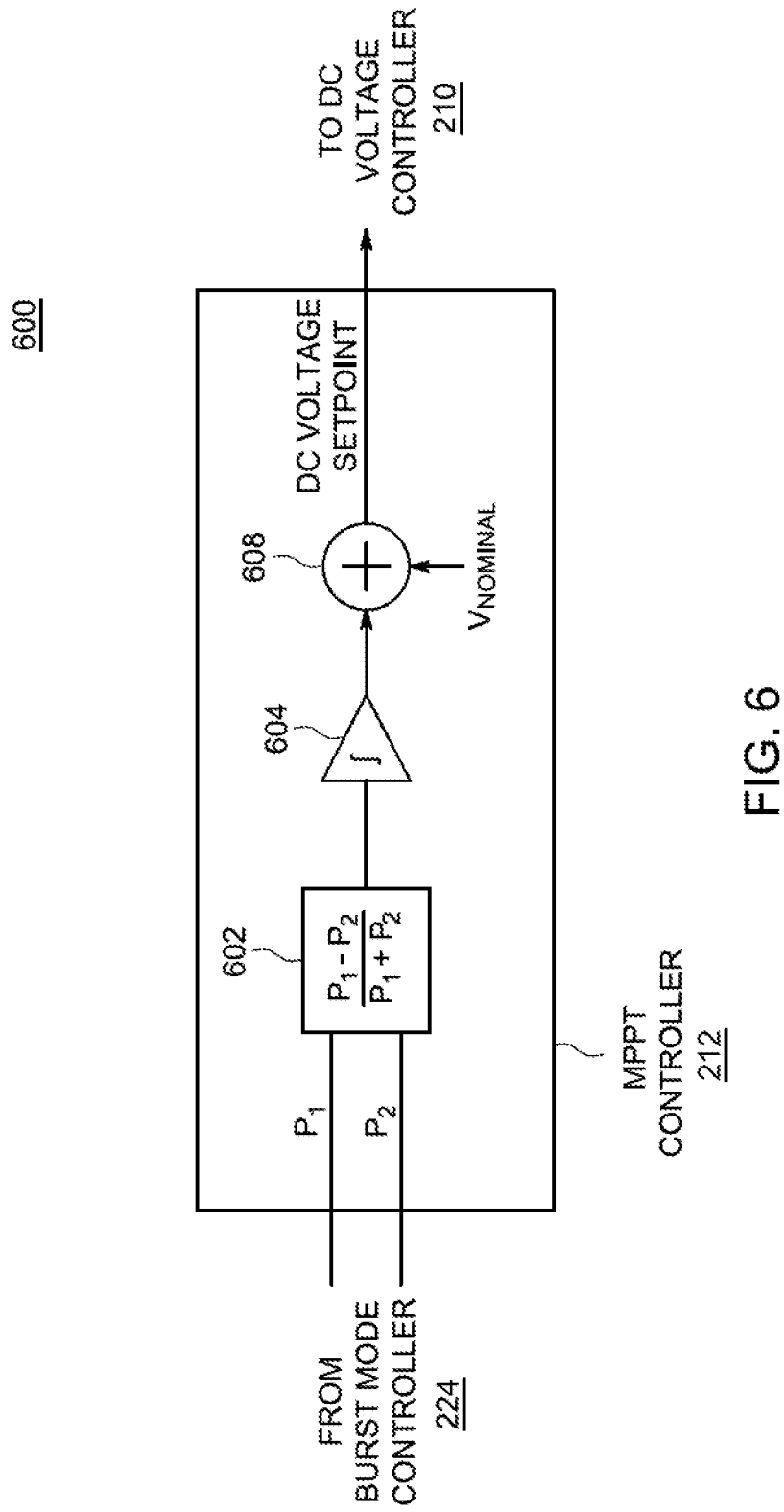
FIG. 6 is a block diagram of an MPPT controller in accordance with one or more embodiments of the present invention.

FIG. 6 is a block diagram of an MPPT controller 212 in accordance with one or more embodiments of the present invention. The MPPT controller 212 comprises a power difference module 602, an integrator 604, and an adder 608. The MPPT controller 212 utilizes the second feedback loop 218 to determine a DC voltage set point for the PV module 104 corresponding to the MPP voltage.

The power difference module 602 receives signals indicative of the first and second power measurements, $P_1$ and $P_2$, from the burst mode controller 224. The power difference module 602 computes a power difference between $P_1$ and $P_2$ and utilizes the power difference to determine an error signal, ε. In some embodiments, the power difference is computed as $(P_2-P_1)/(P_2+P_1)$.

The error signal ε from the power difference module 602 is coupled to the integrator 604. The integrator 604 integrates the error signal ε and couples the integrated error signal to the adder 608. The adder 608 additionally receives an input of a nominal voltage, $V_{nom}$, where $V_{nom}$ is an initial estimate of the MPP voltage. The integrated error signal acts to "fine tune" the nominal voltage such that the DC voltage set point (i.e., the sum of the integrated error and the nominal voltage) corresponds to the MPP voltage. The DC voltage set point is then supplied to the DC voltage controller 210 in order to drive the PV module 104 to operate at the DC voltage set point.

Figure 7:
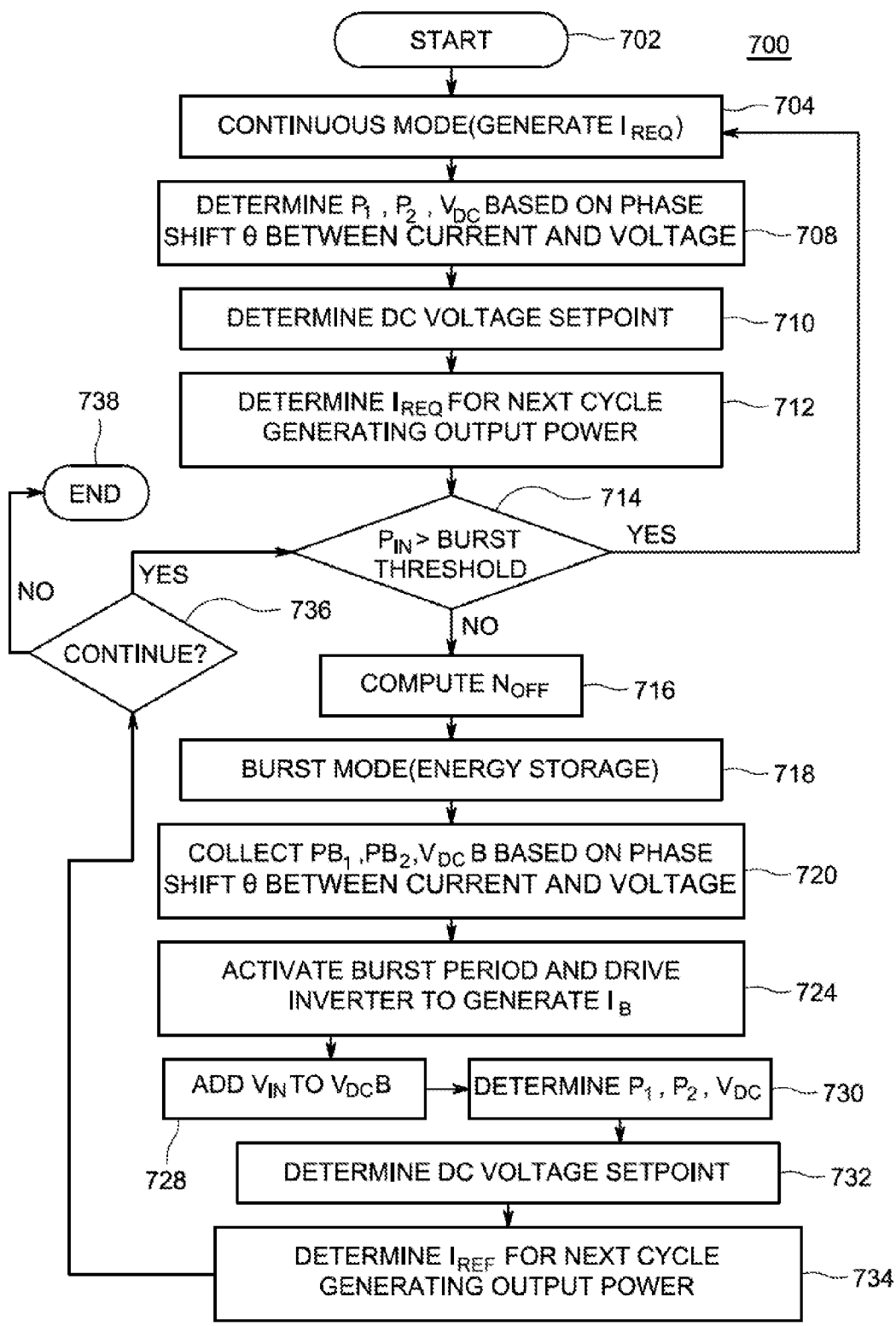
FIG. 7 is a flow diagram of a method for operating an inverter in burst mode with reactive power compensation in accordance with one or more embodiments of the present invention.

FIG. 7 is a flow diagram of a method 700 for operating an inverter in burst mode with reactive power compensation in accordance with one or more embodiments of the present invention. In some embodiments, such as the embodiment described below, a power conversion device, such as a DC-AC inverter, is coupled to the PV module and converts DC power from the PV module to AC power, where such AC power is coupled to a commercial power grid. The inverter is capable of generating an AC current output that is in-phase with the AC grid voltage as well as AC current that is phase-shifted with respect to the AC voltage, as needed. In some embodiments, multiple PV modules may be coupled to a single centralized DC-AC inverter; alternatively, individual PV modules may be coupled to individual DC-AC inverters (e.g., one PV module per DC-AC inverter). In some embodiments, a DC-DC converter may be coupled between the PV module or PV modules and the DC-AC inverter.

The method 700 begins at step 702 and proceeds to step 704. At step 704, the inverter operates in continuous mode and generates an output current, $I_{req}$, such that the PV module is biased proximate the MPP voltage. At step 708 first and second power measurements of the input power from the PV module, $P_1$ and $P_2$, respectively, are obtained based on a phase shift θ, where θ is the phase shift between the AC output current and the AC voltage.

In some embodiments, where there is no reactive power and θ is zero, the first power measurement comprises integrating the input power $P_{in}$ from the PV module during a 90°-180° phase of an AC grid waveform cycle (i.e., a period of the AC grid cycle when the PV module is operating below its DC voltage) to obtain a first "power bin", $PB_1$, where $P_1=PB_1$. The second power measurement comprises integrating $P_{in}$ during the 180°-270° phase of the same AC grid waveform cycle (i.e., a period of the same AC grid cycle when the PV module is operating above its DC voltage) to obtain a second "power bin", $PB_2$, where $P_2=PB_2$. In some embodiments, $P_{in}$ may be sampled during such phases to obtain the first and second power measurements; for example, $P_{in}$ may be sampled at a rate of 256 times the commercial power grid frequency. In alternative embodiments, the first and second power measurements may be obtained during different phases of an AC grid waveform cycle. Additionally, an average, or DC, voltage from the PV module, $V_{DC}$, is computed. In some embodiments, the voltage $V_{in}$ from the PV module is integrated during the 90°-270° phase of the AC grid voltage to obtain a DC voltage "bin", $V_{DC}B$. $V_{DC}$ is then computed based on $V_{DC}B$.

In another example, θ is 30° and there is a phase difference between the current and the voltage output from the inverter (e.g., inverter 102) due to reactive power from the AC grid. In such an example, the integration periods for the power bins $PB_1$ and $PB_2$, as well as $V_{DC}B$, are shifted by θ/2 or 15°. Thus, integration is done from 105°-195° for the first power bin $PB_1$ and 195°-285° the second power bin $PB_2$, and from 105°-285° for $V_{DC}B$.

The method 700 proceeds to step 710, where $P_1$, $P_2$, and $V_{DC}$ are utilized to determine a DC voltage set point for the PV module such that the DC voltage set point corresponds to the MPP voltage, as previously described above. As mentioned with step 708, reactive power causing a phase shift θ, is compensated for adjusting the DC voltage set point by shifting the respective integration periods of the first and second power bins $PB_1$ and $PB_2$ as well as the DC voltage bin $V_{DCB}$ by θ/2.

At step 712, a required inverter output current, $I_{req}$, that will result in the PV module being biased at the desired DC voltage set point is determined as previously described above. Steps 704 through 712 of the method 700 comprise an outer feedback loop that determines whether the PV module is currently biased at the MPP voltage, and, if necessary, adjusts the DC voltage set point to achieve the MPP.

The method 700 proceeds to step 714, where a determination is made whether the PV module input power exceeds a burst mode threshold. If the condition at step 714 is met, the method 700 returns to step 704 and the inverter continues to operate in continuous mode. If the condition at step 714 is not met, the method 700 proceeds to step 716.

At step 716, a maximum number of AC grid voltage cycles, $N_{off}$, for energy storage periods is determined based on a burst mode ripple voltage threshold. In some embodiments, a burst mode ripple voltage threshold of 10% of the PV module DC voltage $V_{DC}$ is utilized. At step 718, the inverter switches to burst mode, and begins an energy storage period of $N_{off}$ AC voltage grid cycles. During the energy storage period, the inverter does not produce any output power, and power generated by the PV module is stored in the inverter.

At step 720, the first and second power bins, $PB_1$ and $PB_2$, are collected, along with the DC voltage bin, $V_{DC}B$ based on the phase shift angle θ between the output current and voltage of the inverter. In some embodiments, the $N_{off}$ AC grid cycles are partitioned into two equal portions—a "first half" of the $N_{off}$ AC voltage grid cycles and a "second half" of the $N_{off}$ AC voltage grid cycles, where the first half occurs prior to the second half. When θ is zero (i.e., no reactive power is generated), $PB_1$ is obtained by integrating the PV module input power $P_{in}$ during any of the 90°-270° AC grid voltage phase periods occurring within the first half, and $PB_2$ is obtained by integrating the PV module input power $P_{in}$ during any of the 90°-270° AC grid voltage phase periods occurring within the second half. Additionally, the PV module input voltage $V_{in}$ is integrated over each 90°-270° phase during the energy storage period to obtain $V_{DC}B$.

Alternatively, when reactive power is generated such that the AC current is delayed by a phase shift θ, the integration periods for determining $PB_1$, $PB_2$, and $V_{DC}B$ are shifted by θ/2. For example, when θ=30°, the phase period 90°-270° is shifted by 15°, and 105°-285°.

The method 700 proceeds to step 724. At step 724, following the energy storage period, a burst period is activated and the inverter begins to generate output power. In some embodiments, the burst period comprises a single AC grid voltage cycle. During the burst period, the required output current $I_{req}$ determined in step 712 is adjusted such that the inverter generates a burst current, $I_B$, in accordance with the amount of energy stored during the energy storage period. In some embodiments, $I_B=I_{req}*(N_{off}+1)$.

At step 728, an input voltage from the PV module is measured and added to the DC voltage bin $V_{DC}B$; in some embodiments with no reactive power (e.g., θ is zero), the PV module input voltage Vin is integrated over the 90°-270° phase of the AC grid voltage cycle and added to $V_{DC}B$. For all other values of θ (i.e., where there is reactive power), the integration period is shifted by θ/2.

The method proceeds to step 730, where $P_1$, $P_2$, and $V_{DC}$ are determined. In some embodiments, $P_1=PB_1/N_{off}$, $P_2=PB_2/N_{off}$, and $V_{DC}$ is the average of $V_{DC}B$.

At step 732, the DC voltage set point for the PV module is determined based on $P_1$, $P_2$, and $V_{DC}$ as previously described. At step 734, the required inverter output current, $I_{req}$, that will result in the PV module being biased at the desired DC voltage set point is determined as previously described.

The method 700 proceeds to step 736, where a determination is made whether operation of the inverter should continue. If the condition at step 736 is met, the method 700 returns to step 714; if the conditions at step 736 is not met, the method 700 proceeds to step 738 where it ends.

Figure 8:
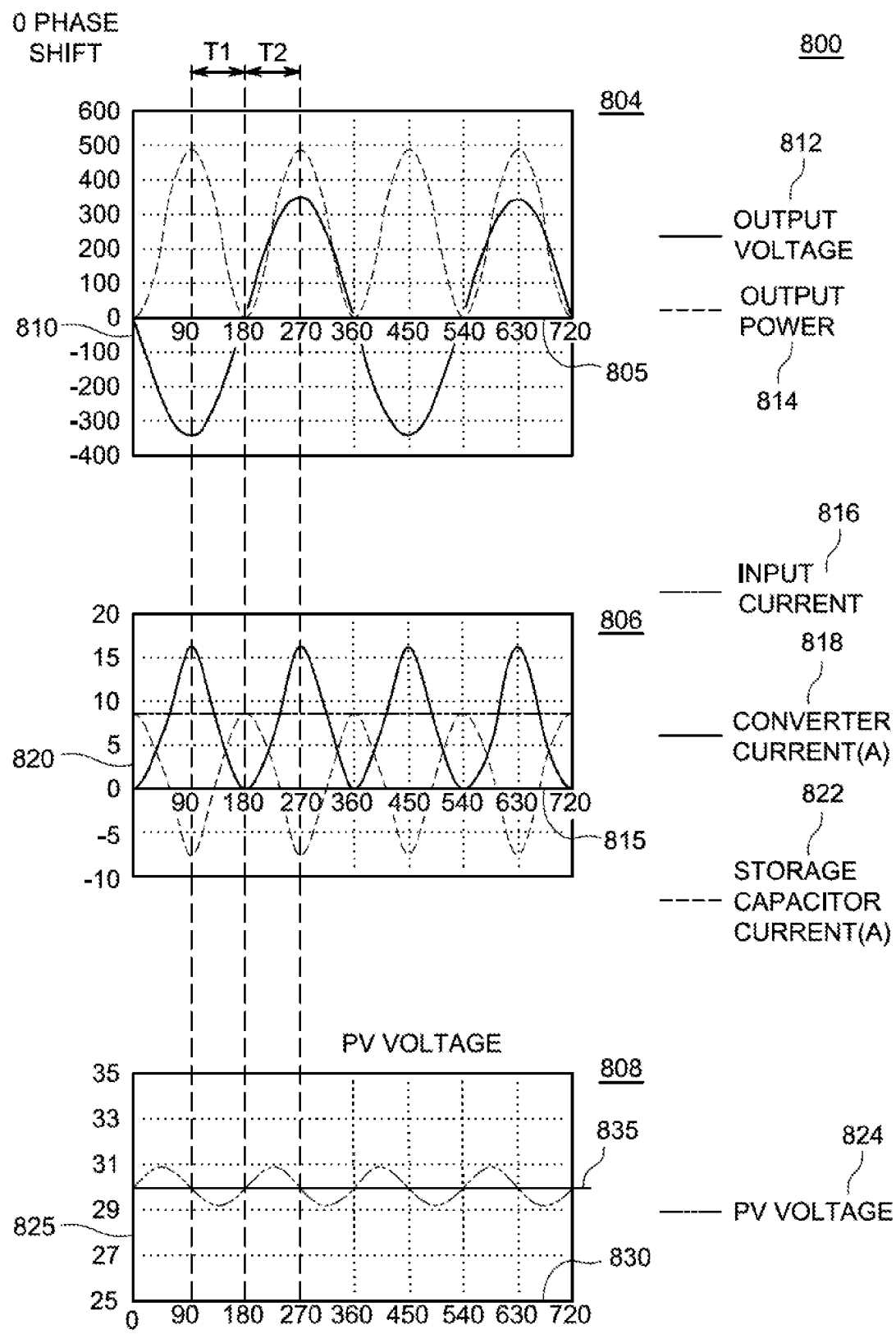
FIG. 8 is a depiction of a series of exemplary graphs of a system in accordance with one or more embodiments of the present invention.
Figure 9:
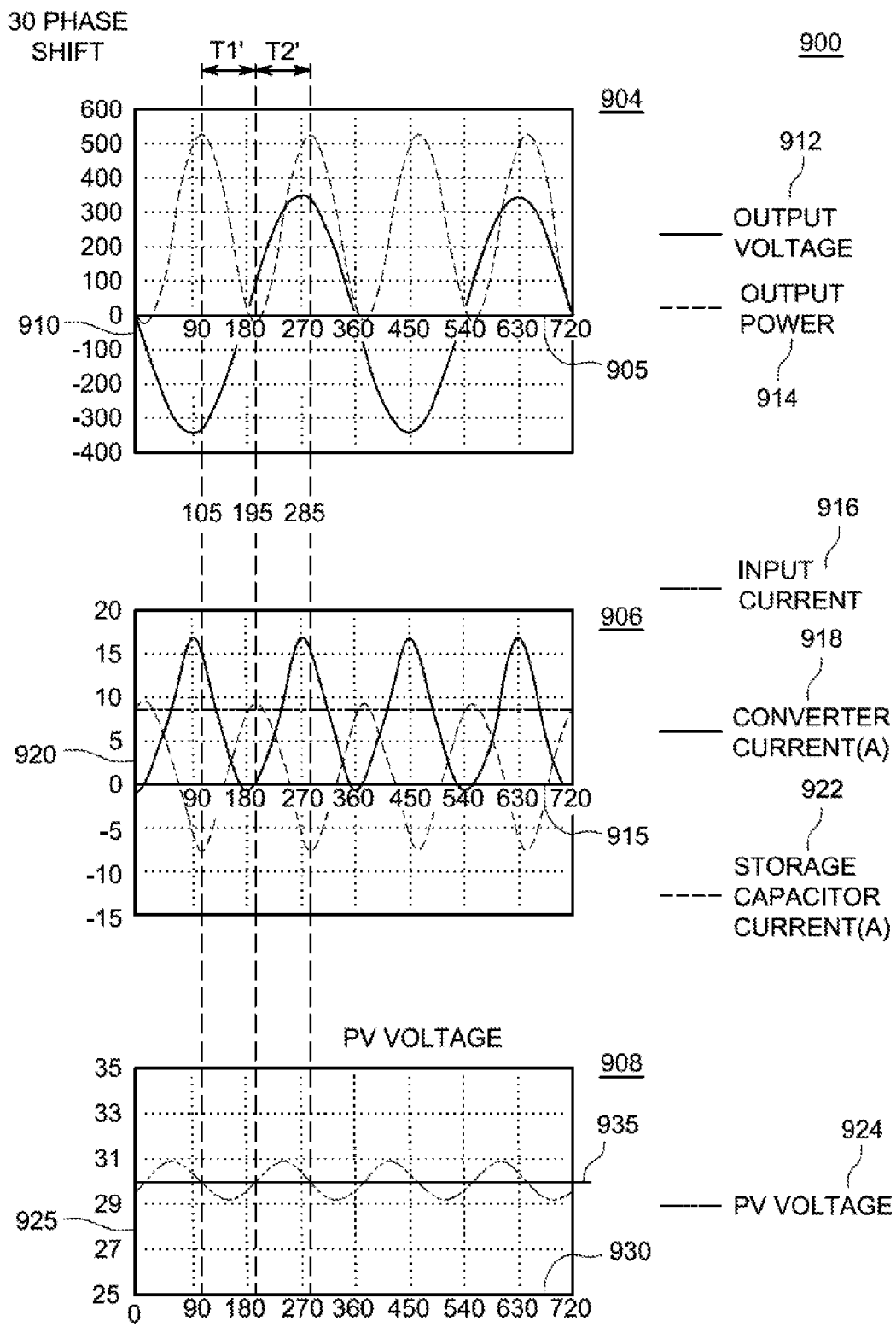
FIG. 9 is a depiction of a series of exemplary graphs of a system in accordance with one or more embodiments of the present invention.
Figure 10:
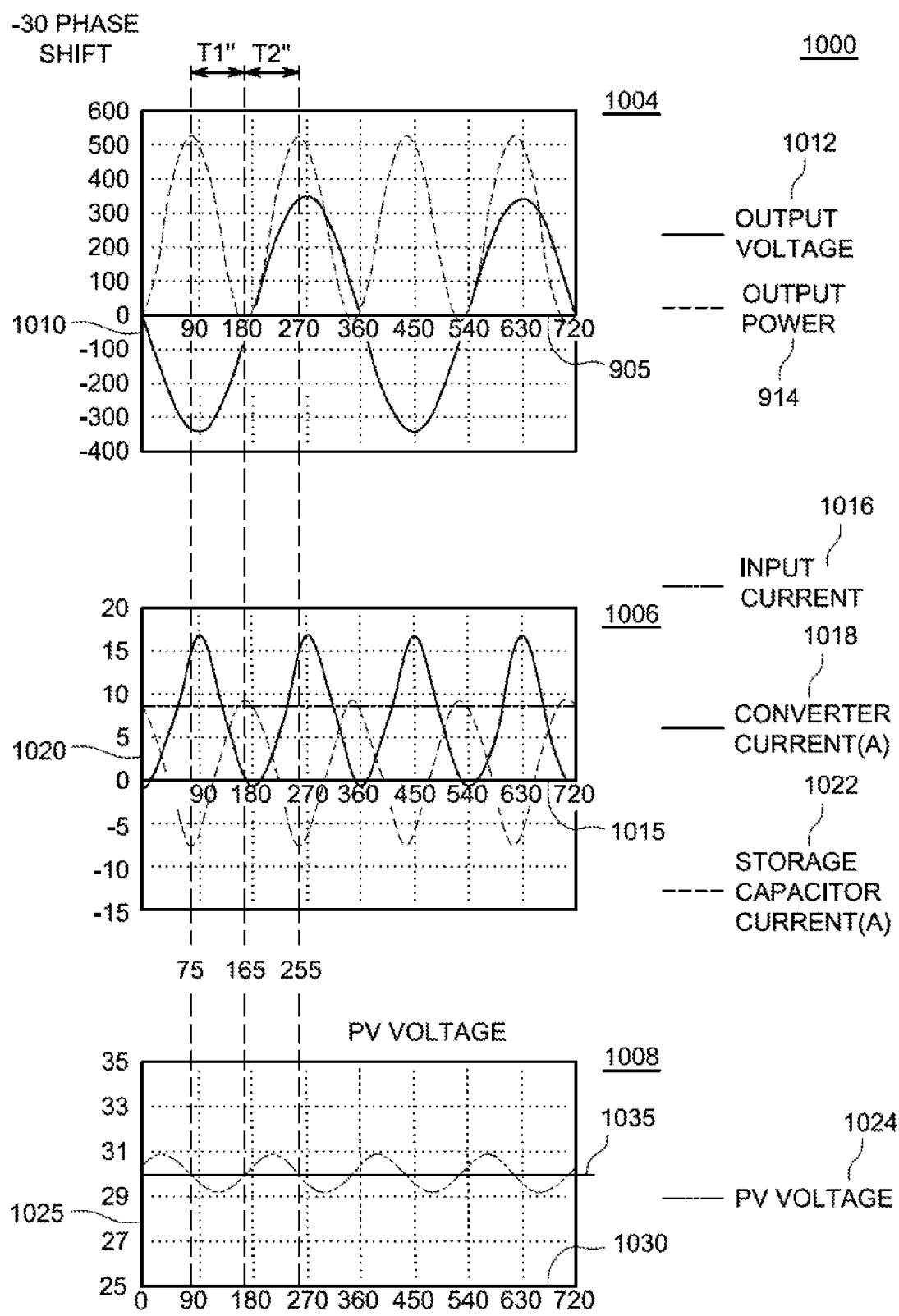
FIG. 10 is a depiction of a series of exemplary graphs of a lagging system in accordance with one or more embodiments of the present invention.

FIGS. 8-10 are illustrations of waveforms depicting collection periods of PV module power for determining MPP when operating in continuous mode in accordance with one or more embodiments of the present invention. At various points in time the inverter output current and voltage are out of phase, therefore calculating power at a particular point in time by taking the product of I and V will result in incorrect calculation of the MPP. Power bins are established as follows: one bin is established where the period of the power matches the period where Vin is less than VdcB, and a second bin where the power matches the period where Vin is greater than VdcB, where VdcB is a decision point, established as the median input voltage. Therefore, the input power observed is averaged in these two bins, PB1 and PB2, where PB1 matches the period where Vin is less than VdcB, and PB2 matches the period where Vin is greater than VdcB. As described below, Vin is output voltage 812, 912, and 1012.

FIG. 8 is a depiction of a series of exemplary graphs 800 of a balanced system in accordance with one or more embodiments of the present invention. The series of exemplary graphs 800 depicts three graphs (804, 806, and 808) where there is a phase shift of 0° (i.e., no reactive power). The graph 804 is a plot of output voltage 812 and output power 814 against magnitude 810 versus phase angle 805. Time periods T1 and T2 (90°-180° and 180°-270° respectively) represent integrating periods to determine the $PB_1$ and $PB_2$ power bins for operating at the MPP.

The graph 806 depicts currents within an inverter plotted as current 820 versus phase angle 815. An input current 816 is a steady DC current from the PV module. A converter current 818 is shown as synchronized but 90° out of phase with a storage capacitor current 822. The graph 808 depicts the PV voltage 824 plotted as voltage 825 versus phase angle 830. As seen in graph 808, the PV module voltage 824 is below its average voltage value 835 during the time period T1 (i.e., the period for integrating the input power to determine $PB_1$) and is above its average voltage value 835 during T2 (i.e., the period for integrating the input power to determine $PB_2$).

FIG. 9 is a depiction of a series of exemplary graphs 900 of a leading system in accordance with one or more embodiments of the present invention. The series of exemplary graphs 900 comprises three graphs (904, 906, and 908) where there is a phase shift Θ of 30° (i.e., the AC current is out of phase by 30°). The graph 904 is a plot of output voltage 912 and output power 914 against magnitude 910 versus phase angle 905. Time periods T1' and T2' represent shifted integrating periods (i.e., shifted with respect to the integration periods used when no reactive power is present) to determine the $PB_1$ and $PB_2$ power bins for operating at the MPP.

As discussed above, for a given phase shift from reactive power, the power bins for analysis are shifted by Θ/2. In other words, when Θ=30° the analysis bins are shifted by 15° e.g., the bins may be from 105°-195° and 195°-285°, or alternatively, 285°-15° and 15°-105°. In graph 904, the time periods T1' and T2' show integration periods from 105°-195° and 195°-285° for respectively determining power bins $PB_1$ and $PB_2$.

The graph 906 depicts currents within an inverter plotted as current 920 versus phase angle 915. An input current 916 is a steady DC current from the PV module. A converter current 918 and storage capacitor current 922 are shown as out of phase with the output voltage 912. The graph 908 depicts the PV voltage 924 plotted as voltage 925 versus phase angle 930. As seen in graph 908, the PV module voltage 924 is below its average voltage value 935 during the time period T1' (i.e., the period for integrating the input power to determine $PB_1$) and is above its average voltage value 935 during T2' (i.e., the period for integrating the input power to determine $PB_2$).

FIG. 10 is a depiction of a series of exemplary graphs 1000 of a system in accordance with one or more embodiments of the present invention. The series of exemplary graphs 1000 comprises three graphs (1004, 1006, and 1008) where there is a phase shift Θ of −30° (i.e., the AC current is out of phase by −30°). The graph 1004 is a plot of output voltage 1012 and output power 1014 against magnitude 1010 versus phase angle 1005. Time periods T1″ and T2″ represent shifted integrating periods (i.e., shifted with respect to the integration periods used when no reactive power is present) to determine the $PB_1$ and $PB_2$ power bins for operating at the MPP.

As discussed above, for a given phase shift from reactive power, the power bins for analysis are shifted by Θ/2. In other words, when Θ=−30°, the analysis bins may be between 75°-165° and 165°-255°, or alternatively, 255°-345° and 345°-75°. In graph 1004, the time periods T1″ and T2″ show integration periods from 75°-165° and 165°-255° for respectively determining power bins $PB_1$ and $PB_2$.

The graph 1006 depicts currents within an inverter plotted as current 1020 versus phase angle 1015. An input current 1016 is a steady DC current from the PV module. A converter current 1018 and a storage capacitor current 1022 are depicted as out of phase with the output voltage 1012. The graph 1008 depicts the PV voltage 1024 plotted as voltage 1025 versus phase angle 1030. As seen in graph 1008, the PV module voltage 1024 is below its average voltage value 1035 during the time period T1″ (i.e., the period for integrating the input power to determine $PB_1$) and is above its average voltage value 1035 during T2″ (i.e., the period for integrating the input power to determine $PB_2$).

While the foregoing is directed to embodiments of the present invention, other and further embodiments of the invention may be devised without departing from the basic scope thereof, and the scope thereof is determined by the claims that follow.

The invention claimed is:

1. An apparatus for converting DC input power to AC output power, comprising:
   a DC-AC inverter employing:
      a first feedback loop for determining a maximum power point (MPP) and operating the DC-AC inverter proximate the MPP; and
      a second feedback loop for determining a difference between a first power measurement and a second power measurement, producing an error signal indicative of the difference, and coupling the error signal to the first feedback loop to adjust at least one operating parameter of the DC-AC inverter to drive toward the MPP, wherein the first power measurement and the second power measurement are each determined based on a phase shift between an AC output voltage from the DC-AC inverter and an AC output current from the DC-AC inverter.

2. The apparatus of claim 1, further comprising a burst mode controller for operating the DC-AC inverter in a burst mode when the DC input power is below a burst mode threshold, wherein during the burst mode (i) energy is stored in a storage capacitor of the DC-AC inverter during a storage period, and (ii) the energy is subsequently drawn from the storage capacitor during a burst period.

3. The apparatus of claim 1, wherein the first power measurement measures the DC input power during a first phase range of at least one cycle of an AC line coupled to an output from the DC-AC inverter and the second power measurement measures the DC input power during a second phase range of the at least one cycle.

4. The apparatus of claim 3, wherein the first phase range and the second phase range are of equal length and the first phase range and the second phase range are shifted with respect to zero-crossings of an AC voltage on the AC line by half of the phase shift.

5. The apparatus of claim 1, wherein the second feedback loop comprises an integrator for integrating the error signal.

6. The apparatus of claim 2, wherein the burst mode controller causes the AC output power to be greater than the DC input power during the burst period.

7. The apparatus of claim 2, wherein the AC output power is zero during the storage period.

8. A method for converting DC input power to AC output power, comprising:
   determining via a first feedback loop of a DC-AC inverter, a maximum power point (MPP);
   operating the DC-AC inverter proximate the MPP;
   determining via a second feedback loop of the DC-AC inverter, a difference in a first power measurement and a second power measurement;
   producing via the second feedback loop of the DC-AC inverter, an error signal indicative of the difference; and
   adjusting via the first feedback loop and using the error signal, at least one operating parameter of the DC-AC inverter to drive toward the MPP, wherein the first power measurement and the second power measurement are each determined based on a phase shift between an AC output voltage from the DC-AC inverter and an AC output current from the DC-AC inverter.

9. The method of claim 8, further comprising operating the DC-AC inverter in a burst mode when the DC input power is below a burst mode threshold, wherein during the burst mode (i) energy is stored in a storage capacitor of the DC-AC inverter during a storage period, and (ii) the energy is subsequently drawn from the storage capacitor during a burst period.

10. The method of claim 8, wherein the first power measurement measures the DC input power during a first phase range of at least one cycle of an AC line coupled to an output from the DC-AC inverter and the second power measurement measures the DC input power during a second phase range of the at least one cycle.

11. The method of claim 10, wherein the first phase range and the second phase range are of equal length and the first phase range and the second phase range are shifted with respect to zero-crossings of an AC voltage on the AC line by half of the phase shift.

12. The method of claim 8, wherein the second feedback loop comprises an integrator for integrating the error signal.

13. The method of claim 9, wherein the AC output power is greater than the DC input power during the burst period.

14. The method of claim 9, wherein the AC output power is zero during the storage period.

15. The method of claim 8, further comprising measuring the DC input power during a first phase range of at least one cycle of a commercial power grid and measuring DC input power during a second phase range of the at least one cycle, wherein both ranges are shifted by the same phase.

16. A system for power conversion, comprising:
   at least one photovoltaic (PV) module;
   at least one DC-AC inverter, coupled to the at least one PV module, wherein each DC-AC inverter of the at least one DC-AC inverter employs:
      a first feedback loop for determining a maximum power point (MPP) and operating the DC-AC inverter proximate the MPP; and
      a second feedback loop for determining a difference between a first power measurement and a second power measurement, producing an error signal indicative of the difference, and coupling the error signal to the first feedback loop to adjust at least one operating parameter of the DC-AC inverter to drive toward the MPP, wherein the first power measurement and the second power measurement are each determined based on a phase shift between an AC output voltage from the DC-AC inverter and an AC output current from the DC-AC inverter.

17. The system of claim 16, further comprising operating each DC-AC inverter of the least one DC-AC inverter in a burst mode when DC input power is below a burst mode threshold, wherein during the burst mode (i) energy is stored in a storage capacitor of the DC-AC inverter during a storage period, and (ii) the energy is subsequently drawn from the storage capacitor during a burst period.

18. The system of claim 16, wherein the first power measurement measures DC input power during a first phase range of at least one cycle of an AC line coupled to an output from the DC-AC inverter and the second power measurement measures the DC input power during a second phase range of the at least one cycle.

19. The system of claim 18, wherein the first phase range and the second phase range are of equal length and the first phase range and the second phase range are shifted with respect to zero-crossings of an AC voltage on the AC line by half of the phase shift.

20. The system of claim 17, wherein the AC output power is zero during the storage period.

* * * * *